Patented June 30, 1925.

1,544,531

UNITED STATES PATENT OFFICE.

CARLETON ELLIS AND NORRIS BOEHMER, OF MONTCLAIR, NEW JERSEY, ASSIGNORS TO CHADELOID CHEMICAL COMPANY, A CORPORATION OF WEST VIRGINIA.

METHOD OF CHLORINATING RUBBER.

No Drawing. Application filed March 22, 1924. Serial No. 701,022.

*To all whom it may concern:*

Be it known that we, CARLETON ELLIS and NORRIS BOEHMER, citizens of the United States, and residents of Montclair, in the county of Essex and State of New Jersey, have invented certain new and useful Improvements in Methods of Chlorinating Rubber, of which the following is a specification.

This application is in part a continuation of co-pending application Serial No. 575,045, filed July 15, 1922, and Serial No. 639,983, filed May 18, 1923. The invention relates to a process of making chlorinated rubber, and relates particularly to the treatment of rubber with chlorine under pressure, and at somewhat elevated temperatures, and conditions favorable to the production of a uniformly chlorinated product.

Raw rubber is not highly soluble in organic solvents and solutions of rubber cannot be made of a sufficient concentration to permit of the production of chlorinated rubber in a cheap manner simply by passing chlorine gas through such solutions. Aside from the reaction which may take place with the solvent, there is the loss of the solvent in handling, the difficulty of removing the solvent from the end product, and various other difficulties. Hence chlorinated rubber has proved relatively costly to manufacture by the old methods.

In the present invention it is an object to do away with the solvent entirely, or in any event, to have no such proportion of solvent present as would accomplish more than a softening effect on the rubber. It is also an object of this invention to produce chlorinated rubber of a high degree of chlorination, or what may be termed perchlorinated rubber. Such products are relatively very soluble in various hydrocarbons, and are notably resistant to reagents, e. g. nitric, sulphuric or hydrochloric acids, and various other acids, or alkaline solutions, etc. These qualities of resistance render perchlorinated rubber highly desirable as coating agents in chemical and other industries.

The raw material preferably employed is crude or unvulcanized rubber such as ordinary crêpe rubber. Rubber latex may also be treated by the present process. Vulcanized or recovered rubber may be utilized, but tends to form insoluble bodies, so that when solubility is an important consideration it should not be used.

The chlorine employed may be ordinary liquid chlorine, or chlorine under high pressure. It should preferably be dry, but the process is not inhibited by the presence of moisture, so that rubber containing a certain amount of moisture may be chlorinated without first drying. The chlorine is preferably used pure, but also may be employed in a diluted form containing nitrogen, carbon dioxide, air, oxygen, etc. The chlorine may also have added to it bromine or iodine, the latter acting to some extent as a catalyst.

The rubber is preferably exposed in thin sheets suitably separated from one another to permit free ingress of chlorine, and also to increase the surface exposed. During the chlorination, swelling occurs, the material increasing in bulk to such an extent that allowance should be made in the chlorination vessel to that end.

In carrying out the invention the preferred method involves the use of an amount of chlorine substantially in excess of that necessary to combine with the rubber, as described in Serial No. 639,983. This excess of chlorine acts as a solvent or flux and the resultant product may vary from a viscous mass, to a thin liquid, depending upon the quantity of chlorine which has been introduced. Liquid chlorine has a notable solvent action on chlorinated rubber, and upon exposure of the mass to atmospheric pressure, or to a reduction in pressure, the excess of chlorine (i. e. the uncombined chlorine) is removed to a greater or less extent. The chlorine may be supplied to the chlorinating vessel by running in the liquid, or it may be distilled into the chlorinator by means of cooling it, while a connected tank of liquid chlorine is warmed. However, the rubber, or partially chlorinated rubber appears to have the property of absorbing the gas from a chlorine atmosphere under proper pressure to form a solution as described, so that the chlorine need not be supplied as the liquid phase if a sufficient quantity of gaseous chlorine under superatmospheric pressure is supplied. By means of a procedure of the sort described, instead of proceeding from the outside of the fragments to the inside, chlorination may be caused to take place practically uniformly and simultaneously throughout the mass, thus securing the advantages of solution in organic solvents, without introducing any extraneous material. However, in order to attain the objects of this invention it is not always necessary to employ chlorine in fluxing or solution-forming proportions, and a less amount may be supplied.

During the chlorination the vessel containing the chlorine is kept under a superatmospheric pressure preferably not less than 60 pounds per square inch, since below this pressure the reaction may not proceed satisfactorily. Preferably much higher pressures are employed varying from 100 lbs. to 270 lbs. or more per square inch.

At ordinary atmospheric temperatures, or those only slightly higher, chlorination takes place at first quite rapidly with the evolution of heat and with the production of hydrogen chloride as a by-product, the less chlorinated grades of chlorinated rubber being readily formed in this way. To produce highly chlorinated rubber, such as that containing 67% or more of combined chlorine, requires a very considerable time at these temperatures. By heating the chlorinator it is possible to decrease materially the time required, as well as to increase the thoroughness and degree of chlorination. Elevation of the temperature also serves to increase the chlorine pressure, which is also desirable.

Too great a degree of heat is to be avoided as it may have a deleterious effect on the product. Darkening and charring may occur, rendering the product less soluble, or entirely insoluble. Temperatures ranging from 50° C. to 75° C. or somewhat higher are suitable, 65°—70° C. being the preferred range. The hydrogen chloride which is formed throughout the reaction, should be discharged from time to time by venting the gases, after which the chlorinator is recharged with chlorine.

Chlorinated rubber may be obtained by the procedure of this invention in the form of a more or less coalesced mass of vesiculated structure, and in the case of rubber which has been treated by the chlorine-solution method it may be obtained in the form of a consolidated mass of fairly uniform structure which also may be of vesiculated structure.

A procedure, which will serve to illustrate the present invention, but which is capable of several modifications, as will be apparent from this disclosure is the following:

211 parts by weight, of crêpe rubber cut into small pieces was placed in a lead vessel inside an iron chlorinator. Chlorine was passed into the apparatus, by means of cooling it while a connected chlorine cylinder was warmed, after which the valves in the line from the cylinder to the chlorinator were closed. The temperature of the chlorinator was then raised to about 70° C. by means of a water jacket containing hot water, and this was continued for 30 to 35 hours, venting the apparatus after each 6 or 7 hours' heating to discharge the hydrogen chloride formed. After venting the chlorinator was recharged with chlorine. At the end of the chlorination the excess chlorine was allowed to evaporate as completely as possible. Upon opening the chlorinator, the product was found in the form of a solid, unified mass, yellow in color, and of vesiculated structure. After washing to remove dissolved and included chlorine and hydrogen chloride, drying and grinding, the product was shown to be a very highly chlorinated grade, yielding solutions in benzol of low viscosity, even in concentrations as high as 33⅓%.

A sample of perchlorinated rubber made in a manner similar to the above contained between 68% and 69% of combined chlorine. When a solution of it was poured out on a glass plate, the solvent quickly evaporated, leaving a hard, brittle, transparent film, having a hardness of about 3 in Moh's scale. This sample softens somewhat at 120° C., with slight darkening. At 150° C. darkening became more marked, and at 170°—180° the fragments became adherent, and there was considerable evidence of decomposition.

The process herein described may be carried out, if desired, in two or more stages, the more or less coalesced mass being removed from the chlorinator and broken up or ground, between the steps of the operation. By this means increased access of chlorine is provided for, but by employing the chlorine-flux method, the necessity for such an operation largely disappears.

In the foregoing and in the appended claims the chlorination of rubber is referred to; but it is to be understood that the use along with chlorine of bromine or other halogens in making a chlorinated product also having other halogens in combination, by a similar or analogous process is not precluded. Likewise, in place of natural rubber, artificial rubber may be employed in some cases as a basis for halogenation; or gutta percha, balata, etc., may be utilized.

The rubber may be treated with hydrogen chloride before chlorination, thus forming first a hydrochloride of rubber, which when reacted with chlorine yields a chlorinated rubber hydrochloride. For the purpose mentioned, the hydrogen chloride formed as a by-product in the chlorination of rubber may be used in the treatment of other batches of rubber, which may in turn be subjected to the action of fresh chlorine gas. This latter process is specifically claimed in an application of C. Ellis, Serial No. 569,138 filed June 17, 1922.

What we claim is:

1. The process which comprises exposing rubber to the action of chlorine under pressure, the latter being in an amount substantially in excess of the combining requirements, and at an elevated temperature below the charring point of the material.

2. The process which comprises exposing unvulcanized rubber to the action of chlorine under pressure, the latter being in an amount substantially in excess of the combining requirements, and at an elevated temperature below the charring point of the material.

CARLETON ELLIS.
NORRIS BOEHMER.